United States Patent Office 3,370,878
Patented Feb. 27, 1968

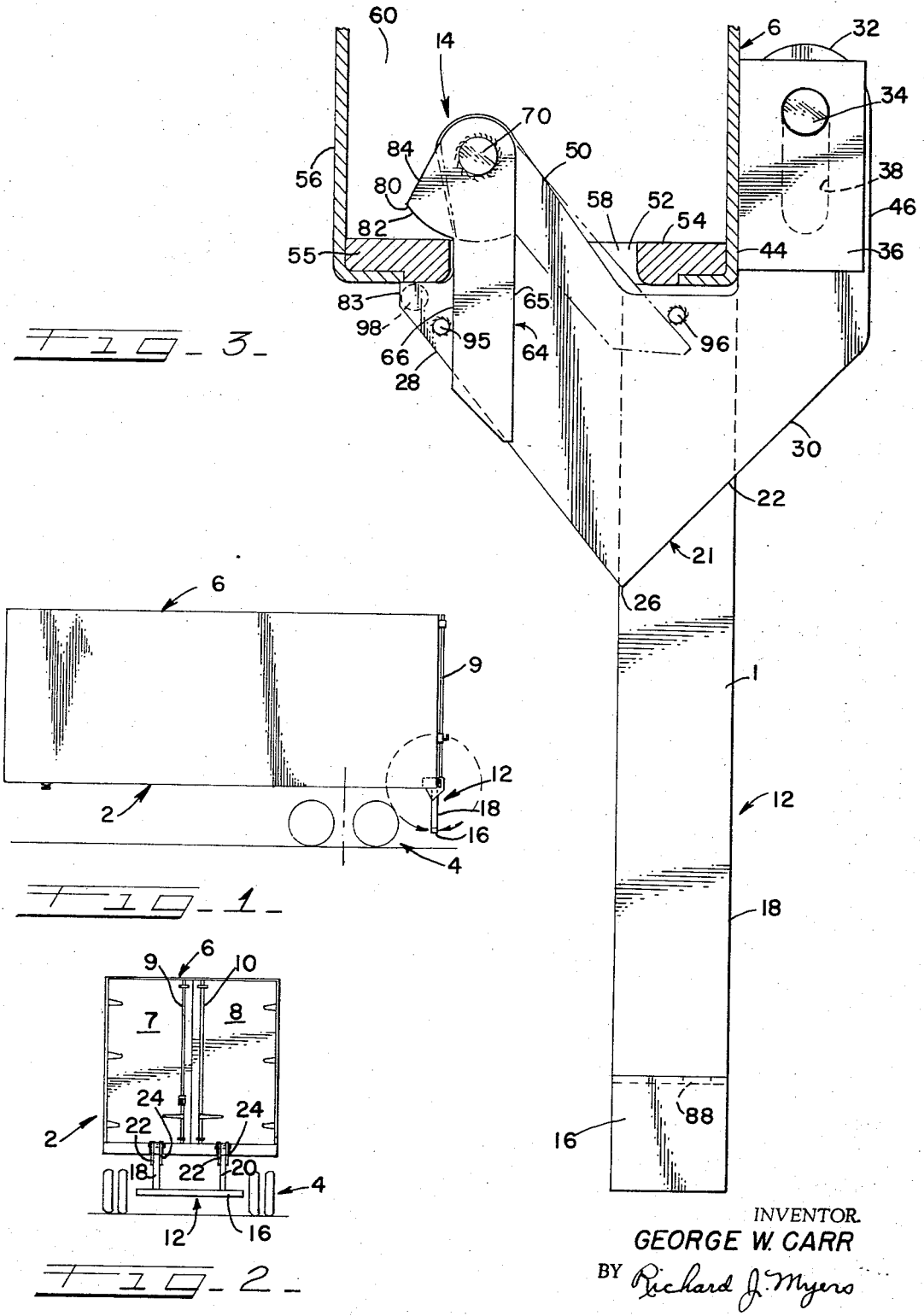

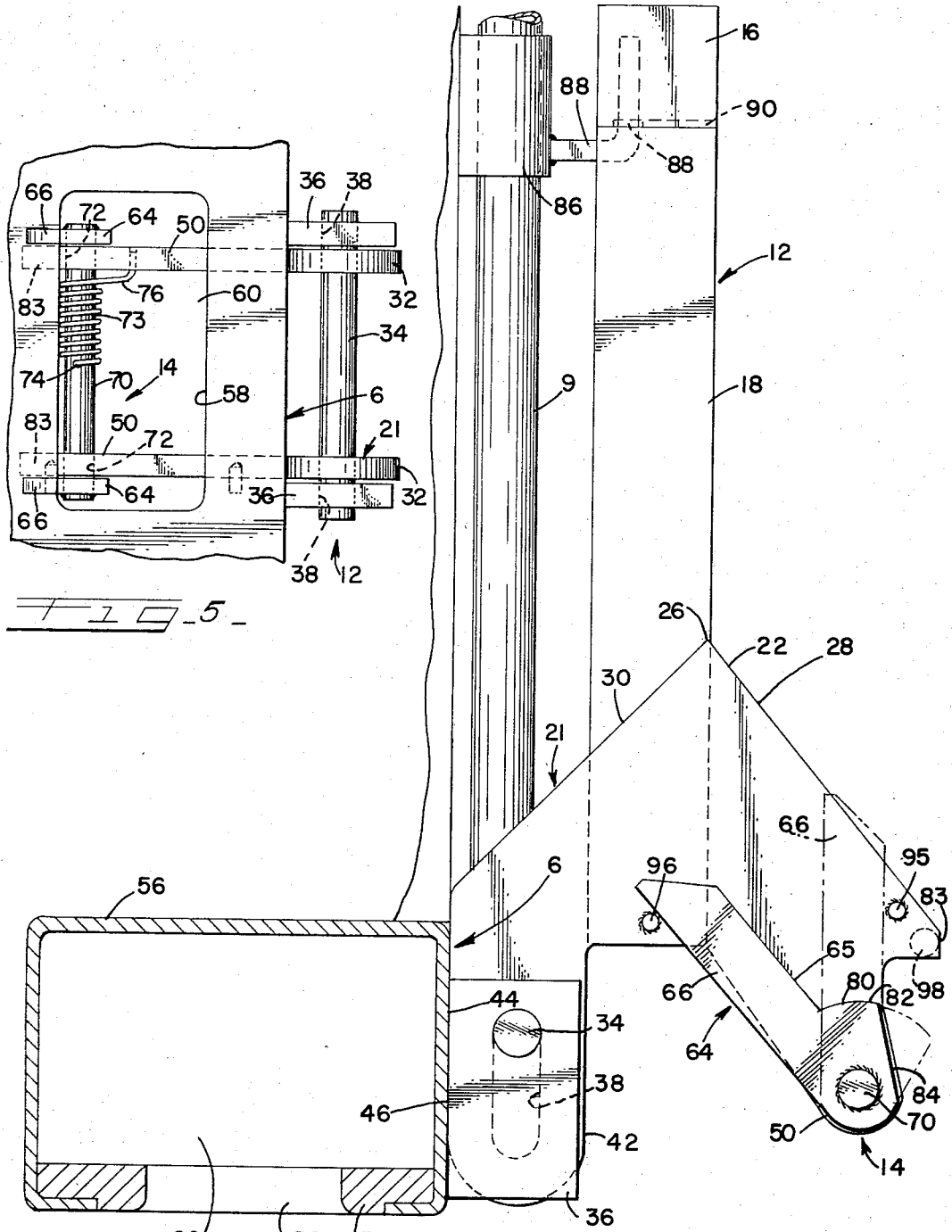

3,370,878
SHIFTABLE BUMPER WITH LOCKING MEANS
George W. Carr, Cincinnati, Ohio, assignor to Pullman Incorporated, Chicago, Ill., a corporation of Delaware
Filed May 31, 1966, Ser. No. 554,138
12 Claims. (Cl. 293—64)

ABSTRACT OF THE DISCLOSURE

A trailer container bumper construction having a bumper bracket pivotally attached to the end of the trailer container with a forward extending bracket portion coupling with the underside of the trailer container, the forward bracket part having lock means in the form of a movable cam to release the forward end of the bracket from the trailer container whereby a bumper attached to the bracket may be swung from a down to an up position and held against the end of the trailer container.

This invention relates generally to a locking means for a bumper and in particular relates to a locking device for a folding bumper that may be used on containers and/or trailers and the like.

A folding bumper is required on containers and/or trailers to fold the bumper away when the container or trailer is loaded on a railway car or on a flat deck, and it may also be required on trailers to facilitate the removal of the sliding bogie type suspension. In many cases openings are provided on the underside of the rear bolster of the container or trailer, these openings being used for engaging locking mechanisms to hold the container in place when it is loaded on a railway car or on a flat deck.

The novel locking device of this invention for folding the bumper may use such openings in the rear bolster, or such openings could be provided specifically for the locking of the folding bumper.

It is therefore a general object of this invention to provide a locking arrangement for a bumper.

Another object of this invention is to provide a locking device for a folding bumper for use on containers and/or trailers or the like.

A still further object of this invention is to provide for a novel locking arrangement for placing a container or trailer bumper or the like in a down or in-use or locked position or in an unlocked or out-of-use position. These and other objects will become more apparent when reference is made to the following description, appended claims, and attached drawings, to wit:

FIG. 1 is a schematic view of a trailer employing the novel bumper locking device;

FIG. 2 is an end view of such trailer and bumper locking device;

FIG. 3 is an enlarged view illustrative of the novel swingable bumper and locking device in the locked position thereof;

FIG. 4 is a view similar to FIG. 3 and is an enlarged view illustrating the swingable bumper and locking mechanism therefor in an out-of-use position and locked to the container or trailer; and FIG. 5 is a top plan view of the novel swingable bumper and locking mechanism.

With reference now to the drawings FIGS. 1 and 2 show a trailer 2 mounted on a standard type of schematically shown bogie suspension 4 and being provided with a container or trailer body 6 having a pair of rear doors 7 and 8 with suitable door opening mechanisms 9 and 10. Depending from the trailer chassis or container is a foldable bumper arrangement 12 which as shown in FIGS. 1 and 2 assumes a downwardly or in-use and locked position and which may be swung therefrom to an unlocked or raised position as indicated by the dotted arrow arrangement of FIG. 1 or as shown in FIG. 3 (locked position) and FIG. 4 (unlocked position).

The bumper arrangement 12 is provided with a novel locking arrangement 14. The bumper unit 12 consists of a lower horizontal member or bar 16 and a pair of upright arms 18 and 20, each of said depending arms 18 and 20 being rigidly attached to a pair of triangulated bracket elements 22 and 24 of locking arrangement 14. Each bracket or hinge part 22 or 24 as seen in FIG. 3 has a lower apex 26 and upwardly diverging sides 28 and 30 and is provided with an upper pivot bracket portion or arm 32 pivotally suspended from the container or trailer body 6 by means of pivot pin 34 and hinge plates 36 permanently attached to the body or container 6 of the trailer 2. The upper part or pivot arm 32 of each bracket 22 or 24 is provided with a vertically extending elongated slot 38 for movement along the pin 34 in swinging the bracket from the down or in-use position, as shown in FIG. 3, to the up or out-of-use position as shown in FIG. 4. The upper hinged portion 32 of the bracket 22 or 24 is provided with a forward vertical surface 42 that abuts with the rear face 44 of the body 6 in the in-use position (see FIG. 3) and has a rear face 46 that abuts with the vertical surface 44 of the container 6 in the out-of-use or up position as seen in FIG. 4. The bracket member 22 or 24 is further provided with a forward upwardly extending arm or catch support 50 spaced forwardly from the arm 32 to define therebetween a recess 52 for the rear bar 54 of the corner casting or bolster 56 which has an opening 58 and allowing the arm 50 to project upwardly therethrough into the bolster or the corner casting recess 60 (see FIG. 3). Both arms 50, 50 of each hinge part 22 or 24 pivotally carry or support a catch means 64, which comprises a pair of transversely spaced apart catch elements 66, 66 that are outwardly spaced from the respective upper arms 50, 50. Each catch element 66 is fixedly attached to a pin 70, which extends through an aperture 72 in each of the arms 50 and the pin or rod 70 has a torsion spring 73 wound thereabout and locked thereto as indicated at 74, and having a spring arm 76 connected to the inner arm 50 of the hinged structure 24. It is thus seen that each hinge plate 22 and 24 defines a hinge structure 21 of the locking arrangement 14 pivotally connected by pin 34 and pivotally carrying the locking structure or catch means 64 of the locking arrangement 14 behind pin 70. Each catch element 66 has an elongated downwardly depending arm 65 that extends through the aperture 58 of the corner casting 56 and is integral with the cam portion 80 of the catch element 66. The cam portion 80 is provided with an upwardly and forwardly rounded cam surface 82 that merges with an upwardly and rearwardly sloping surface 84 (as seen in FIG. 3) whereby the downwardly depending arm 65 of the catch element 66 is in the form of a handle or lever that may be moved by the operator to allow the cam surface 82 to rotate in an arc about the outer end of the upper arm 50 against the action of the biasing spring 73 to allow both the cam surfaces 82 and 84 to clear the forward bar 55 of the corner casting 56 and pass through the corner casting recess 58 when swinging the bumper arrangement 18 rearwardly in a counter-clockwise direction to the position shown in FIG. 4 where the bumper is in the out-of-use position. Each hinge or hanger 22 or 24 has a front edge or ledge 83 that engages the underside of bolster part 55 of bolster 56 in limiting movement of the locking arrangement in the locked position. It will be noted that in FIG. 4 the bumper arrangement is in the inverted position and by raising the bumper arrangement 12 over the L-shaped hook 85 attached to the door opening rod bracket 86 of the door opening structure 9 and letting the L-shaped hook 85 pass through opening 88 in the lower horizontal plate 90 of the foldable bumper structure 12, the bumper structure is held against unnecessary movement, appreciating that the bumper is held in this upright position by the bearing of its surface 46 against the surface 44 of the container 6. It will be appreciated that the various types of tying arrangements such as the L-shaped hook device 85 may be employed for tying the bumper to the trailer to prevent unnecessary rattling or oscillating movement of the bumper arrangement. Stops 95 and 96 (see FIG. 3) are provided on the outside surface of the hinge bracket portions 22 or 24 for limiting movement of the hanging catch element 66 between these stops 95 and 96 as shown in solid and dotted line positions in FIGS. 3 and 4 should the spring 73 for some reason become dislodged or inoperative, as the spring 73 would normally keep the depending catch arm 66 against the stop 95 unless pulled away by the operator. A tie rod 98 is provided between the hinge angulated bracket portion 22 or 24 of the bracket means 21 for additional strength and to keep objects free of the angulated portion of the bracket portions 22 and 24.

The invention herein described is a novel bumper arrangement provided with a novel locking structure therefor whereby the locking structure may be so positioned as to allow the bumper to swing from an in-use position to an out-of-use position, and therefore the bumper is out of the way for placing the container or trailer on a flat bed or railway car and also for allowing the sliding bogie suspension to be moved rearwardly from the trailer.

The foregoing description and appended drawings are given merely to explain and illustrate the invention and the invention is not to be limited thereto, except insofar as the inventive claims are so limited since those skilled in the art who may have the disclosure before them will be able to make modifications and variations therein without departing from the scope of the invention.

What is claimed is:

1. A bumper arrangement for bumper pivotal attachment to a vehicle body comprising: a downwardly extending bumper, bumper bracket means attached to the bumper for depending the bumper, said bumper bracket means having an upper outer end pivot means at one end thereof for pivotal attachment to the outer end of the body and being provided with catch supporting means at its upper inner end and extendible within an opening in the body, and catch means pivotally carried by the catch supporting means, said catch means having upper cam means extendible within the body opening and having biasing means connected with the catch supporting means and the cam means and having lower lever means affixed to the cam means and extendible out of the body opening, said biasing means urging the cam means into engagement with the body opening preventing removal of the cam means from the body opening in the locking position of the catch means and said lever means being swingable against the action of the biasing means about the catch supporting means from the locking position to an unlocking position for permitting removal of the cam means from the body opening and swinging movement of the bracket means and bumper from downwardly extending operating position to an upward extending out-of-use position, the outer end of the bracket means having bracket holding means adapted for engagement with the end of the vehicle body for maintaining the bracket means and bumper in the upward extending out-of-use position.

2. The invention according to claim 1 and said bracket means being provided with a pair of limits for restricting the movement of said lever means.

3. The invention according to claim 5 and said limit means comprising a pair of stops on said bracket means.

4. The invention according to claim 1 and said bumper bracket means comprising a pair of spaced apart bracket elements and said bracket pivot means coupling each of the bracket elements together, said catch supporting means having a catch support arm for each bracket and the cam means having a pair of cam portions each having a pivotal connection with a respective support arm, said lever means comprising a pair of levers each having a fixed connection with a respective cam portion and with one another, each respective cam portion and lever being spaced outwardly of a respective bracket element, the lower end of each of the bracket elements fixedly carrying said depending bumper.

5. The invention according to claim 1 and said bracket means comprising a bracket member and said pivot means comprising a pivot arm and said catch supporting means comprising an upper catch supporting arm spaced from the pivot arm, said lever means comprising a lower depending arm and said cam means comprising an upper cam portion affixed to said lower depending arm.

6. The invention according to claim 1 and said bracket holding means being provided with an elongated slot for holding the bracket in place against the side of the body in the out-of-use position.

7. The invention according to claim 1, and said bumper bracket means having a portion for limiting upward movement of said cam means within the body opening.

8. A locking bumper arrangement for attachment to a vehicle comprising: a downwardly extending bumper, a vehicle body having a body end and a body underside opening, a bumper bracket pivotally attached to the body opening and attached to the bumper and depending the bumper therefrom, said bumper bracket having outer upper end pivot means pivotally attached to the end of the body and being provided with inner upper catch supporting means at its other end extendible within the opening in the body, and catch means pivotally carried by the catch supporting means, said catch means having cam means extendible within the body opening and having biasing means connected with the catch supporting means and the cam means and having lever means affixed to the cam means and extendible out of the body opening, said biasing means urging the cam means into engagement with the body opening for preventing removal of the cam means from the body opening in the locking position of the catch means and said lever means being swingable against the action of the biasing means about the catch supporting means from the locking position to an unlocking position for permitting removal of the cam means from the body opening and swinging movement of the bumper bracket and bumper from the down operating position to an up out-of-use position, and said pivot means of the bracket having bracket holding means engaging with the end of the vehicle body for maintaining the bracket and bumper in the up out-of-use position.

9. The invention according to claim 8 and said body end being provided with hook means coupling with said bumper in the out-of-use position.

10. The invention according to claim 8 and said holding means being provided with an elongated slot for holding said bracket in place against the body end in the up out-of-use position.

11. A locking arrangement for a foldable vehicle bumper for attachment to an apertured portion of a vehicle body comprising: a bumper unit, a bumper bracket means attached to said bumper unit and comprising a pair of spaced apart hinged bracket elements each adapted to have an upper outer portion thereof pivotally connected to the end of the body and each bracket element having an inner upper arm portion extendible through a respective aperture in the underside of the body, each bracket element having a lower portion attached to the bumper unit and depending the bumper unit between each of the bracket elements, said inner arm portion of each bracket element pivotally carrying a catch member, each catch member having a pivotal cam extendible within a body aperture and a cam moving lever extendible without the body aperture for pivoting the cam for cooperative locking engagement of the cam within a body aperture whereby each handle may be swung from an inner depending locking position to an upper outwardly unlocking position for allowing pivotal action of the bracket means having its upper inner arm portions passing out of the apertured portion of the body and allowing swinging of each bracket element about its pivotal connection to the body from a depending in-use inward position to an upper stored outward position, each bracket element having holding means adapted for engagement with the end of the body for holding the bracket element and the bumper unit in the upper stored outward position.

12. A vehicle body bumper construction comprising a bumper bracket having a first upper end arm adapted for pivotal connection to the end of a vehicle body and a second inner arm adapted for insertion into an opening in the underside of the vehicle body and a lower depending bracket segment, a bumper element dependingly fixedly connected to the bracket segment, catch means pivotally connecting with the second arm and extendible into the opening, said catch means comprising a cam portion and a depending handle portion, the cam portion being adapted for introduction into said opening with said second arm and said depending catch handle portion being extendible outwardly of said opening, whereby in the locked position said cam portion engages with said inside of the opening and prevents removal of the bumper element from the locked in-use position and whereby said depending handle portion may be swung from the in-use position to the out-of-use position allowing said cam portion and said second arm to clear said opening whereby said bracket may be rotated into a raised position with the end arm of the bracket engaging the end of the vehicle, and holding means on said first arm for holding said bracket in the raised position against the end of the vehicle body.

References Cited

UNITED STATES PATENTS

| | | | |
|---|---|---|---|
| 863,124 | 8/1907 | Welton | 293—71 |
| 965,800 | 7/1910 | Docherty | 145—34 |
| 1,021,796 | 4/1912 | Randerson | 293—73 |
| 1,035,610 | 8/1912 | Lederer | 293—73 |
| 1,354,273 | 9/1920 | Arnold et al. | 293—73 |
| 1,513,991 | 11/1924 | Homan et al. | 293—69 |
| 1,596,903 | 8/1926 | Thwaits | 293—73 |
| 1,689,147 | 10/1928 | McCloud | 293—73 |
| 1,699,473 | 1/1929 | Maier | 293—73 XR |
| 2,146,642 | 2/1939 | Mueth | 293—73 |
| 2,188,142 | 1/1940 | Blair | 293—73 |
| 2,672,363 | 3/1954 | Buchanan | 293—73 |
| 2,717,798 | 9/1955 | Dodt et al. | 293—73 XR |
| 2,789,854 | 4/1957 | Hope | 293—69 |
| 2,990,212 | 6/1961 | Nicastro | 293—34 |
| 3,090,634 | 5/1963 | Hesketh et al. | 293—101 XR |
| 3,173,717 | 3/1965 | Peras | 293—73 |
| 3,210,110 | 10/1965 | Chieger | 293—73 |

FOREIGN PATENTS

| | | |
|---|---|---|
| 228,596 | 1/1925 | Great Britain. |

ARTHUR L. LA POINT, *Primary Examiner.*

H. BELTRAN, *Assistant Examiner.*